US012521266B2

(12) United States Patent
Bauerfeind et al.

(10) Patent No.: US 12,521,266 B2
(45) Date of Patent: Jan. 13, 2026

(54) BACK SUPPORT BELT

(71) Applicant: Bauerfeind AG, Zeulenroda-Triebes (DE)

(72) Inventors: Hans B. Bauerfeind, Zeulenroda-Triebes (DE); Gerald Stier, Zeulenroda-Triebes (DE); Sandro Hebenstreit, Zeulenroda-Triebes (DE)

(73) Assignee: Bauerfeind AG, Zeulenroda-Triebes (DE)

( * ) Notice: Subject to any disclaimer, the term of this patent is extended or adjusted under 35 U.S.C. 154(b) by 107 days.

(21) Appl. No.: 18/559,486

(22) PCT Filed: May 5, 2022

(86) PCT No.: PCT/EP2022/062212
§ 371 (c)(1),
(2) Date: Nov. 7, 2023

(87) PCT Pub. No.: WO2022/234046
PCT Pub. Date: Nov. 10, 2022

(65) Prior Publication Data
US 2024/0225882 A1    Jul. 11, 2024

(30) Foreign Application Priority Data

May 7, 2021    (DE) .................... 10 2021 204 656.8

(51) Int. Cl.
*A61F 5/02*    (2006.01)
(52) U.S. Cl.
CPC .............. *A61F 5/026* (2013.01); *A61F 5/028* (2013.01)

(58) Field of Classification Search
CPC .. A61F 5/026; A61F 5/028; A61F 5/02; A61F 5/024; A61F 5/022; A61F 5/03; A45F 3/14; A41D 13/0531; A41D 13/1245; A41F 15/00; A41F 15/002; A41F 15/02; A41F 9/002; A41F 9/005
See application file for complete search history.

(56) References Cited

U.S. PATENT DOCUMENTS

| 2006/0005293 A1 | 1/2006 | Frey et al. |
| 2013/0090585 A1 | 4/2013 | Bie, Jr. et al. |

(Continued)

FOREIGN PATENT DOCUMENTS

| DE | 10 2013 222372 A1 | 5/2015 |
| DE | 10 2017 220968 A1 | 5/2019 |

(Continued)

OTHER PUBLICATIONS

International Search Report and Written Opinion dated Aug. 22, 2022 for International Patent Application No. PCT/EP2022/062212, 12 pages.

(Continued)

*Primary Examiner* — Ophelia A Hawthorne
(74) *Attorney, Agent, or Firm* — Sheppard Mullin Richter & Hampton LLP

(57) ABSTRACT

The invention relates to a back support belt system, particularly to a back orthosis or reclination orthosis for the treatment and prevention of back disorders. The system has a pelvic belt and two independent left and right shoulder belts extending therefrom, and a guiding module associated with the shoulder belts.

14 Claims, 15 Drawing Sheets

(56) References Cited

U.S. PATENT DOCUMENTS

| | | |
|---|---|---|
| 2019/0029866 A1 | 1/2019 | Stier et al. |
| 2019/0350736 A1 | 11/2019 | Beck et al. |
| 2021/0022900 A1 | 1/2021 | Hebenstreit et al. |
| 2021/0177638 A1 | 6/2021 | Schiermeister et al. |

FOREIGN PATENT DOCUMENTS

| | | | |
|---|---|---|---|
| DE | 10 2018 211431 A1 | 1/2020 | |
| EP | 3 407 842 B1 | 5/2020 | |
| JP | 2011062245 A | 3/2011 | |
| WO | WO-2020011604 A1 * | 1/2020 | ............... A41D 1/02 |

OTHER PUBLICATIONS

International Preliminary Report on Patentability for PCT/EP2022/062212 dated Nov. 16, 2023. 10 pages.

* cited by examiner a)

b)

BACK SUPPORT BELT

CROSS REFERENCE TO RELATED APPLICATIONS

This application is a U.S. National Stage Application under 35 U.S.C. 371 of International Application No. PCT/EP2022/062212, filed May 5, 2022, which claims priority to German Patent Application 10 2021 204 656.8, filed May 7, 2021, the contents of each which are hereby incorporated by reference in their entirety into the present disclosure.

The invention relates to a back support belt system, in particular a back orthosis or reclination orthosis for the treatment and prevention of back disorders. The system has a pelvic belt and two independent left and right shoulder belts extending therefrom, which cross each other several times in the region of the back.

Back support belt systems serve for straighten the upper body, for example to treat and correct postural defects and distorted spines, for example in osteoporosis. Known back support belt systems and orthoses essentially consist of a pelvic belt which can be closed under tension over the pelvis or hip of a patient, or of a wearer in general, and which is then intended to form a base for the force introduction to the back. Known systems also contain belts or support rails that extend from the pelvic belt and are intended to reposition or support the shoulders in spatial relation to the spine or the upper spinal section in relation to the lower spinal section through targeted force introduction. The interaction of these elements is intended to mechanically stabilise the wearer's spine and straighten it, especially in the region of the shoulder and upper thoracic spine. The more shoulder belts are tensioned, the more the shoulders should be pulled back, whereby the upper body can be straightened.

Back support belt systems are also intended to help reduce stress on the back when lifting and carrying loads, in particular to avoid excessive stress, by specifically absorbing and distributing the forces generated in the process, especially in the region of the shoulders. Support belts are intended to transfer the forces acting on the upper body primarily via the arms and shoulders when lifting and carrying loads directly to the pelvis or torso. The spine should thus be bridged and relieved. In addition, a back support belt system is intended to remind the wearer not to assume a harmful, stressful, protective posture in the event of excessive poor posture of the upper body, and to convey a feeling of safety and stability. Back support belt systems should thus also serve to protect healthy people at work. At the same time, back support belts should guide and limit movement in a controlled manner in order to avoid incorrect postures that are unfavourable for the back when lifting or carrying loads. This is useful in occupational health and safety, in rehabilitation and in certain sporting activities. Back belt-based orthoses are known from JP 2001-062245 A, JP 2001-224613 A and U.S. Pat. No. 5,499,965 A.

The disadvantage of known back support belt systems or back orthoses of this type is the complex structure, which makes applying more difficult for the wearer and which is why misuse can hardly be ruled out. The mostly rigid design of known supports with support elements and belts helps to achieve a support effect, but individual adaptation to the specific indication, to the specific therapy requirements and/or to the anatomical conditions of a wearer is not possible to a sufficient extent. Particularly when the user is moving, in certain phases of movement, under special stress or already when tensioning the back support belt system during applying or afterwards, an unintentional slipping of the support belt system on the body (migration) into a position occurs which, on the one hand, strongly impairs the wearing feeling and, on the other hand, can make the orthosis essentially ineffective. In practice, it is especially difficult for patients with limited mobility to apply such belt systems and to generate the necessary tension on the support elements and the pelvic belt after application. It can also be difficult to apply an orthosis that has already been set up to provide sufficient support, i.e., pre-tensioned, in a functional manner under this tension. Pre-tensioned shoulder belts can pull a pelvic belt, to which they are connected, unfavourably upwards, particularly into the upper waist section, towards the lower thorax when applying, so that a functional fit on the pelvis can no longer be achieved.

DE 10 2018 211 431 A1 discloses a back support belt system in which applying to the wearer is facilitated.

The invention was based on the technical problem of improving such back support belt systems or back orthoses, such as reclination orthoses, which are based at least on a basic structure containing a pelvic belt socket with force-introducing shoulder belts extending therefrom, in such a way that not only is application to the wearer uncomplicated, but in which, in addition, migration of the system, particularly of the pelvic socket, is already effectively prevented during application or during use, particularly when the wearer moves. In this way, the support and relief effect of such systems should be improved and also be able to be maintained over the entire period of wearing.

The technical problem is fully solved by the novel back support belt or back orthosis construction according to the claims.

In particular, the technical problem is solved by back orthosis containing:
- a pelvic belt for applying to the pelvis of a wearer, having a lumbar/sacral positionable middle section and, extending laterally therefrom in each case, a left side section with a left pelvic belt end and a right side section with a right pelvic belt end, wherein the pelvic belt ends are connectable to one another under tension for applying,
- a right shoulder belt for applying over the right shoulder of the wearer, connected by its first end to the left side section of the pelvic belt, and
- a left shoulder belt for applying over the left shoulder of the wearer, connected by its first end to the right side section of the pelvic belt,
- wherein the right shoulder belt and the left shoulder belt cross at a dorsal mid-upper crossing point in the applied state, a dorsal mid-lower crossing point in the applied state and two lateral crossing points each in the applied state, wherein the back orthosis has a guiding module associated with the shoulder belts, wherein the guiding module comprises
- a first guiding element,
- a second guiding element
- a third guiding element
- a fourth guiding element
- a first connecting element
- a second connecting element
- a third connecting element
- a fourth connecting element
- a fifth connecting element,
- wherein the first connecting element is positioned at the dorsal mid-upper crossing point and connects the first guiding element and the second guiding element as a joint, wherein the second connecting element is positioned at the first lateral crossing point and connects the first guiding element and the third guiding element as a joint, wherein the third connecting element is positioned at the second lateral crossing point and connects the second guiding element and the fourth guiding element as a joint, wherein the third guiding element and the fourth guiding element cross over in the region of the dorsal mid-lower crossing point, and wherein the right shoulder belt is connected to the guiding module via its second end and the left shoulder belt is connected to the guiding module via its second end, in particular wherein the right shoulder belt is reversibly connected to the fourth guiding element via its second end and wherein the left shoulder belt is reversibly connected to the third guiding element via its second end.

Thus, the present invention is in particular characterised by a guiding module of various guiding elements and connecting elements. The first, second, third and fourth guiding elements form a rhombus shape via the connecting elements and the crossing of the third guiding element and the fourth guiding element, wherein the rhombus is variable in shape and angle via the hinged mounting by the connecting elements and the displaceability of the third guiding element and the fourth guiding element in the crossing region. In particular, the height, i.e., the distance between the first connecting element and the crossing region of the third and fourth guiding elements in the region of the dorsal, middle, lower crossing point, can also change. The guiding module thus comprises at least one rhombus-shaped element, which is variable in height and width due to the hinged connection of the guiding elements, i.e., it represents a scissor rhombus.

The shoulder belts are preferably guided along the guiding elements in the dorsal region, so that a change in the position and/or length of the shoulder belts acts on the guiding elements and leads to a change in the height or width of the rhombic element of the guiding module. At the same time, the guiding elements preferably guide the belts, so that the belt courses in this region are also rhombus-shaped.

Surprisingly, it turned out that these rhombus-shaped belt courses on the wearer's back better prevent the orthosis from slipping. When sitting down or bending over, the back lengthens and thus stretches the rhombus-shaped structure of the guiding module. Since rhombuses are, so to speak, two interconnected scissors, the guiding module can follow the changes in length that occur due to movement very well without the entire system losing stability. This change in length may be an elongation or a compression, depending on the movement of the wearer. In particular, the present invention can minimise or prevent the back orthosis from riding up when the wearer sits down. The geometric shape of the guiding module, i.e., the rhombus, changes in particular between the positions of the wearer "sitting" and "standing".

The four guiding elements thus form the four legs of a rhombus, wherein a change in shape, i.e., a change in length and width, is made possible by the hinged mounting in three connecting elements and the movable crossing of the third guiding element and the fourth guiding element.

According to the invention, the guiding module can be connected either directly to the third guiding element and the fourth guiding element via a fourth connecting element and a fifth connecting element to the pelvic belt, or indirectly via further intermediate elements. Thus, further rhombuses or semi-rhombuses can be formed below the described rhombus shape of the guiding module by further guiding elements and connecting elements.

In a preferred embodiment, the third guiding element is connected directly to the middle section of the pelvic belt via the fourth connecting element as a joint and the fourth guiding element is connected directly to the middle section of the pelvic belt via the fifth connecting element as a joint.

In this embodiment, the first guiding element, the second guiding element, the third guiding element and the fourth guiding element form a rhombus, wherein the sections of the third guiding element and the fourth guiding element between the region where these two guiding elements cross and the fourth guiding element and the fifth guiding element with which these two guiding elements are connected to the pelvic belt form another semi-rhombus.

In an alternative embodiment, the fourth connecting element connects the third guiding element and a fifth guiding element as a joint, wherein the fifth connecting element connects the fourth guiding element and a sixth guiding element as a joint, wherein the fifth guiding element is connected to the middle section of the pelvic belt via a sixth connecting element as a joint and the sixth guiding element is connected to the middle section of the pelvic belt via a seventh connecting element as a joint.

In a preferred embodiment, the second ends of the shoulder belts are variably adjustable on the associated guiding elements, or the fourth and third guiding elements each have at least one deflecting element through which the associated shoulder belt is guided respectively and the second end can be reversibly and variably fastened to the shoulder belt.

According to the invention, "deflecting element" is primarily understood to mean an eyelet or ring for guiding through a strap or rope, but also a mounted roller or roller block. An anti-slip or slip-enhancing coating can be provided, depending on the focus of the use.

The deflecting elements in the guiding elements allow the shoulder belts to be set on themselves. This makes it possible to cover different size ranges with a single orthotic structural shape.

In an alternative embodiment, the shoulder belts do not run on the guiding module, but the shoulder belts end at the top of the guiding module and are fastened thereto. In this embodiment, the guiding module forms an intermediate piece on the back between the shoulder belts and the pelvic belt. Thus, the guiding module or the guiding elements are part of the belt run.

In this embodiment, the second end of the left shoulder belt can then preferably be connected to the third guiding element in the region of the second connecting element and the second end of the right shoulder belt can be connected to the fourth guiding element in the region of the third connecting element. In this embodiment, the first end of the left shoulder belt can then preferably be connected to the second guiding element in the region of the first connecting element and the first end of the right shoulder belt can be connected to the first guiding element in the region of the first connecting element. In this embodiment, the second end of the left shoulder belt can then preferably be connected to the third guiding element in the region of the second connecting element, the second end of the right shoulder belt can be connected to the fourth guiding element in the region of the third connecting element, the first end of the left shoulder belt can be connected to the second guiding element in the region of the first connecting element and the first end of the right shoulder belt can be connected to the first guiding element in the region of the first connecting element. The respective connections may of course be reversible designed.

If the first end of the left shoulder belt is connected to the second guiding element in the region of the first connecting element and the first end of the right shoulder belt is connected to the first guiding element in the region of the first connecting element, it can be provided that an additional belt is connected to the second guiding element in the region of the third connecting element and guides to and is connected to the right side section of the pelvic belt and an additional belt is connected to the first guiding element in the region of the second connecting element and guides to and is connected to the left side section of the pelvic belt. The respective connections may of course be reversible designed.

In a preferred embodiment, the guiding elements are formed from a flexible material which is substantially inelastic in the direction of tension, for example plastic, leather or metal, in particular spring steel strip.

In a preferred embodiment, the guiding elements may be formed of spring leaves, for example of metal. This has the advantage that the guiding elements can be adapted to the shape of the body and can be used in different thicknesses. Also, a standardisation can be achieved by which production costs can be saved.

Additional rods can also be assigned to the guiding module and in particular to the guiding elements. These can follow the course of the guiding elements, in particular they can follow their longitudinal course in the middle of the guiding elements. Alternatively, additional rods can also directly connect connecting elements to each other, for example, the mid-upper connecting element and the connecting element connecting the pelvic belt or the two lateral connecting elements to each other. It is thus possible to fit the back orthosis with rods along the course of the spine according to the indication. This can be helpful for back disorders, in particular also for scoliosis.

In a further embodiment, the support belt system according to the invention is guided in separate cross guides at least at the crossing points of the shoulder belt loops. This serves in particular to simplify the fit of the back orthosis to the wearer or user, since the cross guides keep the crossing shoulder belts in the correct positions. Preferably, at least one such cross guide is provided in the upper mid-back crossing point.

Preferably, the cross guides are integrated into the corresponding connecting elements.

For example, passage openings in the connecting elements may form such cross guides.

In a preferred embodiment, the first connecting element, the second connecting element and/or the third connecting element have pass-through openings through which the right shoulder belt and the left shoulder belt are slidably guided. Preferably, the first connecting element, the second connecting element and the third connecting element each have a first pass-through opening through which the right shoulder belt is slidably guided and each have a second pass-through opening through which the left shoulder belt is slidably guided.

The connecting elements connect either each two guiding elements to each other or one guiding element to the pelvic belt. The two guiding elements or the guiding element and the pelvic belt are hingedly connected. The connecting elements therefore function not only as a connection, but also as a hinge to ensure the desired mobility around an axis. The connecting elements can, for example, be carried out as rivets or screws that pass through holes in the guiding elements or through the material of the pelvic belt. If necessary, elongated holes can also be provided as corresponding holes in the guiding elements.

Elongated holes are particularly suitable if further rhombuses or semi-rhombuses are formed below the described rhombus shape of the guiding module by further guiding elements and connecting elements. This allows greater freedom of movement, which is advantageous, for example, in the case of a scoliosis of the wearer.

The connecting elements, in particular the connecting elements that hingedly connect two guiding elements, can also be designed as solid-state joints. For example, they may be produced from a more flexible material than the guiding joints. In such an embodiment, the guiding module can be made in one-piece. For example, the individual components of the guiding module can be materially connected via flexible/elastic connections, so that the guiding module is a two-component element. Additional slots in the connecting elements or in the one-piece guiding module can reinforce the material's tendency to move. The slots may, for example, be meander-shaped or have other geometries.

The skilled person is familiar with suitable embodiments for such connecting elements that enable the desired mobility in an axis.

In a preferred embodiment, to the fourth connecting element and the fifth connecting element is a hingedly connected force introducing belt fastened, respectively, wherein the force introducing belts are reversibly connected to the pelvic belt. This is particularly suitable in the embodiment of the back orthosis in which the third guiding element and the fourth guiding element are not directly connected to the pelvic belt.

The skilled person is familiar with suitable embodiments and materials of the shoulder belts, for example from DE 10 2018 211 431 A1. Alternatively, the shoulder belts can also be formed as a cable pull system or Bowden cable.

The shoulder belts can, for example, be carried out elastic, inelastic, partially elastic, or flexible but inelastic.

Tensioning of the shoulder belts can be achieved by variable and flexible fixing of the belts to the pelvic belt and/or to the guiding elements. Alternatively, for example when using a Bowden cable or cable pull system, tensioning elements can also be provided, for example tensioning knobs for winding up the tensioning rope.

It can also be provided that the shoulder belts are each divided into two and thus have a first partial section and a second partial section, wherein the two partial sections are connected to each other via a deflecting element. One section can be fixedly connected to the deflecting element, the other belt section can be guided through the deflecting element and then reversibly connected to itself, for example via a Velcro fastener. This can facilitate tensioning of the shoulder belts by the wearer.

In a preferred embodiment, the first ends of the shoulder belts are reversibly connected to the pelvic belt, in particular via a Velcro fastener.

For example, the left side section and the right side section of the pelvic belt can have fixed regions on which the first ends of the shoulder belts are reversibly and freely positionably attachable. This allows for basic tightening and positioning of the shoulder belts.

The pelvic belt itself can be closed in a conventional manner, for example by a Velcro fastener at the two ends of the pelvic belt, in particular closed under tension. Corresponding embodiments of a pelvic belt are known to the skilled person.

In preferred embodiments of the invention, at least one region of each of the shoulder belts is formed as a particularly elastic belt section.

According to the invention, "elastic belt section" is primarily understood to mean an elastic, i.e., stretchable by tensile stress, flexible band, particularly in the form of a woven belt. Functionally equivalent embodiments, in particular elastomeric bands, preferably made of rubber, silicone rubber, polyurethane and the like, are also covered thereby. Alternatively, elastic tensioning ropes with elastomer fibre inserts are also to be understood. It is envisaged that these elastic belt sections, particularly in comparison with the other sections of the shoulder belts, are more elastic, i.e., can be stretched further when subjected to tensile stress. In a preferred variant, these elastic belt sections are each the only components of the shoulder belts that are stretched, i.e., elongated, under the tensile forces that can occur during proper use of the orthosis, especially when the back is bent.

This elastic belt section is preferably arranged each at that region of the shoulder belts which each pulls upwards over the rear upper back to the shoulders. Since the change in length when bending the back is particularly pronounced in this region of the body, the particularly elastic belt section arranged there can reduce excessive tension of the belts, i.e., compensate for it particularly through its own stretching when bending. Thus, on the one hand, the elasticity of the belt section serves to limit the tensile force of the tension introduced by the shoulder belts into the pelvic belt, which further prevents migration of the pelvic belt. On the other hand, it can also be used to compensate for the change in length of the back when bending, which keeps the shoulder belts in position at the shoulder, gives freedom of movement and increases the comfort and effectiveness of the back belt system.

In a variant thereof, this elastic end section is additionally provided with a separately formed mechanical stretch limiter guided parallel to the elastic section. The stretch limiter may be formed as at least one less elastic or inelastic band connected to each of the ends of the elastic section. Depending on the desired therapeutic goal or intended use of the system, this may serve to control movement during flexion. In particular, it is intended to prevent excessive flexion of the back, which may be indicated therapeutically, for example in post-operative rehabilitation or in the field of occupational health and safety when lifting loads for reclination and posture improvement and the resulting improvement of load introduction in the back.

In a preferred embodiment, an elastic belt section is formed between the first end of the shoulder belt and the lateral crossing point, respectively, the elasticity of which is equal to or higher than that of the shoulder belt itself.

The back support belt system according to the invention makes it possible to remind the wearer to adopt a gentler posture, i.e., especially: an upright posture, in the event of an incorrect posture of the upper body, i.e., especially: torso strongly bent forward and, in the worst case, additional rotation of the back in the bent-forward posture. Lifting loads with a curved spine results in load shifting to the front part of the ventral pillar of the vertebral body. By straightening the spine and lifting from the knees (upright posture), the load is advantageously distributed over a large region on the ventral pillar. The upright posture can be assumed by the wearer especially when he experiences an increased pull over the shoulder belt system according to the invention when bending the upper body forward. The pelvic belt serves as an "anchor" and establishes the central fixed point, which is used to generate a force on the shoulders in the dorsal direction via the belt system from the movement. Another side effect of the tightly fitting tensioned pelvic belt of the back support belt system of the invention is to provide a sense of security and stabilisation to the wearer of the system.

In a particular embodiment, the back support belt system according to the invention is therefore rigged on an elastic waistcoat or jacket, wherein the shoulder belts and/or the pelvic belt are fixed at least in sections to the waistcoat or jacket.

The present invention also solves the technical problem underlying it by a clothing item containing a stretchable waistcoat or jacket and a back support belt system according to the invention, wherein shoulder belts and pelvic belt are at least sectionally rigged on a waistcoat or jacket and fixedly connected thereto. The clothing item according to the invention may be, for example, protective work clothing.

In the simplest case, the back support belt system is sewn to the waistcoat or jacket. In an alternative embodiment, the support belts are guided in tabs on the waistcoat or jacket. The formation on a waistcoat or jacket allows for simplified donning and doffing, which is particularly useful in the case of short-term and recurring use of the back support belt system by a wearer, for example in the field of occupational safety. The waistcoat or jacket used is made of elastic fabric or knitted fabric. Alternatively, flexible waistcoats, such as are known per se as high-visibility waistcoats, can be upgraded with the back support belt system according to the invention.

In the context of the present invention, a "wearer" is understood to be a person who applies and uses, i.e., wears, the belt system according to the invention, for example in the context of occupational safety measures, in order to prevent excessive stress or incorrect posture, for example when working, especially when carrying loads. Furthermore, this is understood to mean a patient who applies and uses, i.e., wears, the belt system according to the invention, for example in the context of therapy measures, in order to counteract excessive stress or incorrect posture of a previously damaged, diseased musculoskeletal system or to enable targeted movement guidance in the sense of therapy of the diseased musculoskeletal system.

The present invention also solves the underlying technical problem by using a back orthosis according to the invention or a clothing item according to the invention to protect against disadvantageous stresses on the back.

In particular, this comprises a non-medical use in which the back orthosis according to the invention is worn as protection, in particular as work protection, i.e., is worn in particular prophylactically.

The invention is illustrated in more detail by the following specific examples of embodiments, without these being to be understood as limiting.

REFERENCE LIST back orthosis (10)
back orthosis (11)
right shoulder belt (22)
first partial section of right shoulder belt (22a)
second partial section of right shoulder belt (22b)
additional right belt (22c)
second end of right shoulder belt (23)
left shoulder belt (24)
first partial section of left shoulder belt (24a)
second partial section of left shoulder belt (24b)
additional left strap (24c)

second end of left shoulder belt (25)
first end of right shoulder belt (26)
first end of left shoulder belt (27)
deflecting element on the right shoulder belt (28)
deflecting element on the left shoulder belt (29)
pelvic belt (30)
middle section (31)
left side section (32)
left pelvic belt end (33)
right side section (34)
right pelvic belt end (35)
velcro element (36*a*)
velcro element (36*b*)
velcro fastener (36)
mid-upper crossing point (41)
left lateral crossing point (42)
mid-lower crossing point (43)
right lateral crossing point (44)
elastic belt section of right shoulder belt (86)
elastic belt section of left shoulder belt (87)
guiding module (100)
first guiding element (101)
second guiding element (102)
third guiding element (103)
fourth guiding element (104)
fifth guiding element (105)
sixth guiding element (106)
first connecting element (141)
second connecting element (142)
third connecting element (143)
fourth connecting element (144)
fifth connecting element (145)
sixth connecting element (146)
seventh connecting element (147)
pass-through opening of the first connecting element (151)
first pass-through opening of the first connecting element (151*a*)
second pass-through opening of the first connecting element (151*b*)
pass-through opening of the second connecting element (152)
first pass-through opening of the second connecting element (152*a*)
second pass-through opening of the second connecting element (152*b*)
pass-through opening of the third connecting element (153)
first pass-through opening of the third connecting element (153*a*)
second pass-through opening of the third connecting element (153*b*)
force introducing belt at the fourth connecting element (154)
force introducing belt at the fifth connecting element (155)
deflecting element of the third guiding element (163)
deflecting element of the fourth guiding element (164)
jacket (200)

Figure 1:
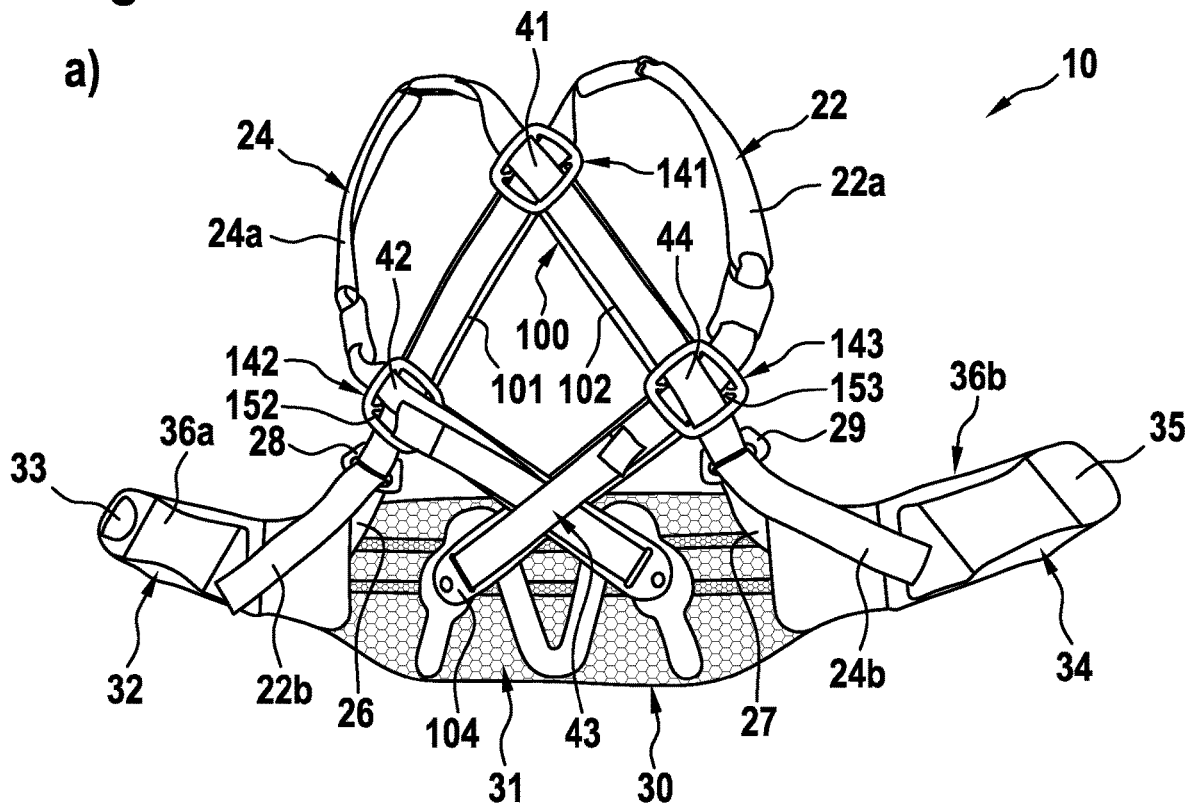
FIG. 1 shows a first embodiment of the back orthosis according to the invention in two different positions.
Figure 1:
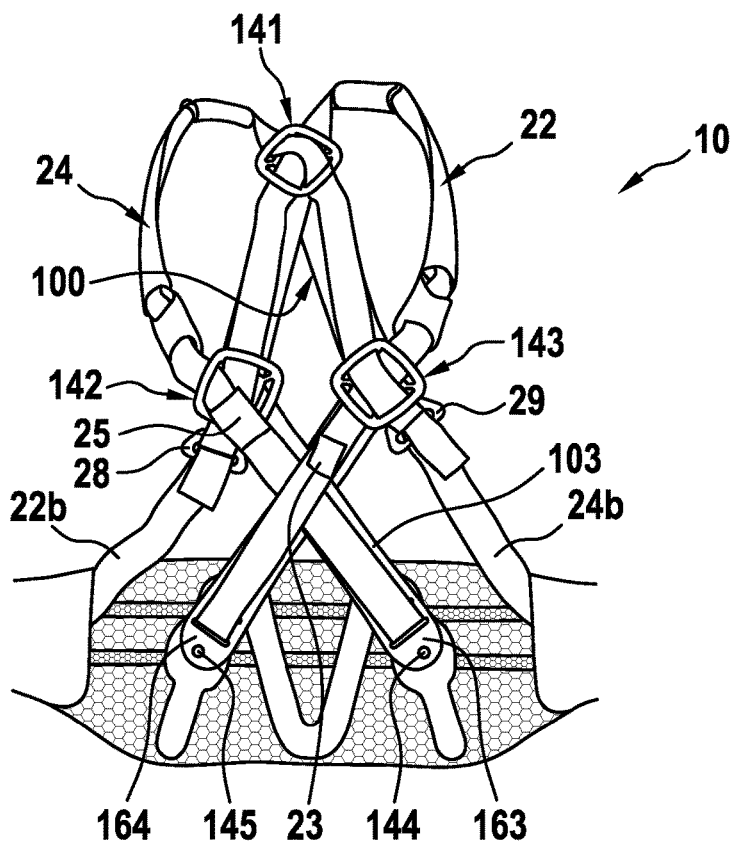

FIG. 1 shows a first embodiment of the back orthosis (10) according to the invention. In FIGS. 1*a* and 1*b*, the back orthosis (10) is shown in various positions. The back orthosis (10) comprises a pelvic belt (30), a right shoulder belt (22), which in the worn state comprises the right shoulder, a left shoulder belt (24), which in the worn state comprises the left shoulder of the wearer, and a guiding module (100) lying under the shoulder belts.

The pelvic belt (30) has a middle section (31), a left side section (32) with a left pelvic belt end (33) and a right side section (34) with a right pelvic belt end (35). The left side section (32) and the right side section (34) can be connected to each other via Velcro elements (36*a*, 36*b*) of a Velcro fastener. The right shoulder belt (22) is connected via its first end (26) to the left side section (32) of the pelvic belt (30), and the left shoulder belt (24) is connected via its first end (27) to the right side section (34) of the pelvic belt (30). In the present embodiment, the two shoulder belts (22, 24) are carried out in two-pieces (22*a*, 22*b*, 24*a*, 24*b*), wherein the two pieces (22*a*, 22*b*, 24*a*, 24*b*) of the shoulder belts (22, 24) are each connected to one another via deflecting eyelets (28, 29), so that length adjustability is provided, wherein the parts (22*b*, 24*b*) fastened to the pelvic belt (30) can be attached to themselves after deflection for fixation.

The right shoulder belt (22) and the left shoulder belt (24) cross each other a total of four times, namely at a mid-upper crossing point (41), at a left lateral crossing point (42), at a mid-lower crossing point (43) and at a right lateral crossing point (44). The guiding module (100) with its various elements is located in the region between these crossing points (41, 42, 43, 44) and additionally up to the middle section (31) of the pelvic belt (30). The first connecting element (141) of the module (100) can be seen at the mid-upper crossing point (41). The second connecting element (142) is located at the left lateral crossing point (42) and the third connecting element (143) is located at the right lateral crossing point (44). Of these three connecting elements (141, 142, 143), the pass-through openings (151, 152, 153) for the shoulder belts (22, 24) are primarily visible. Also partially visible among the belts are the first guiding element (101), the second guiding element (102), the third guiding element (103) and the fourth guiding element (104). The third guiding element (103) is movably fastened to the middle section (31) of the pelvic belt (30) via a fourth connecting element (144) and the fourth guiding element (104) is movably fastened to the pelvic belt (30) via a fifth connecting element (145). The third guiding element (103) and the fourth guiding element (104) each have a deflecting element (163, 164) through which the second end (23) of the right shoulder belt (22) and the second end (25) of the left shoulder belt (24) are passed through, so that the second end (23, 25) each can be fastened reversibly and variably to the shoulder belts (22, 24) via a Velcro fastener, so that a tension possibility of the shoulder belts (22, 24) is provided here.

Figure 2:
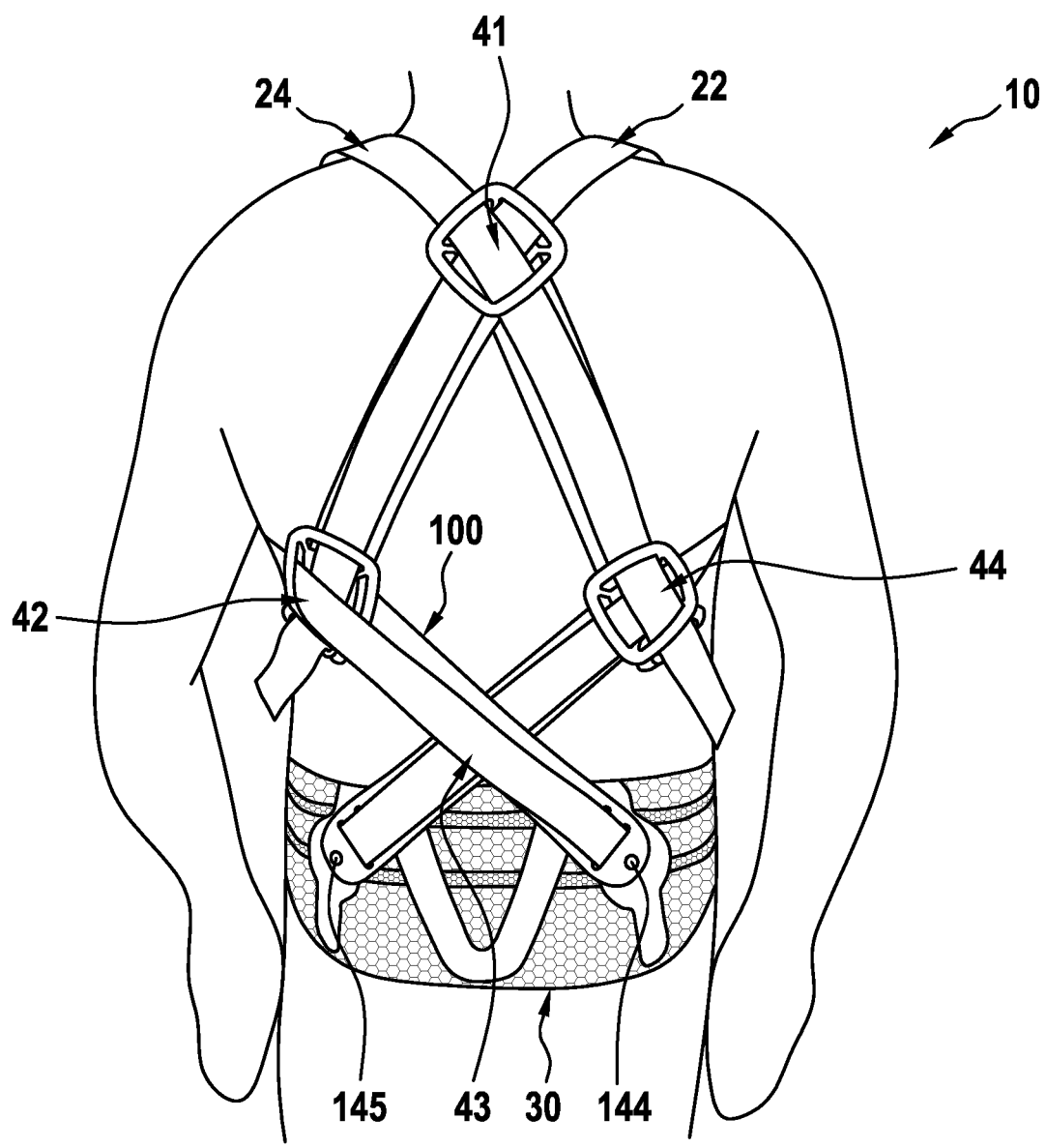
FIG. 2 shows the back orthosis of FIG. 1 on a person standing.
Figure 3:
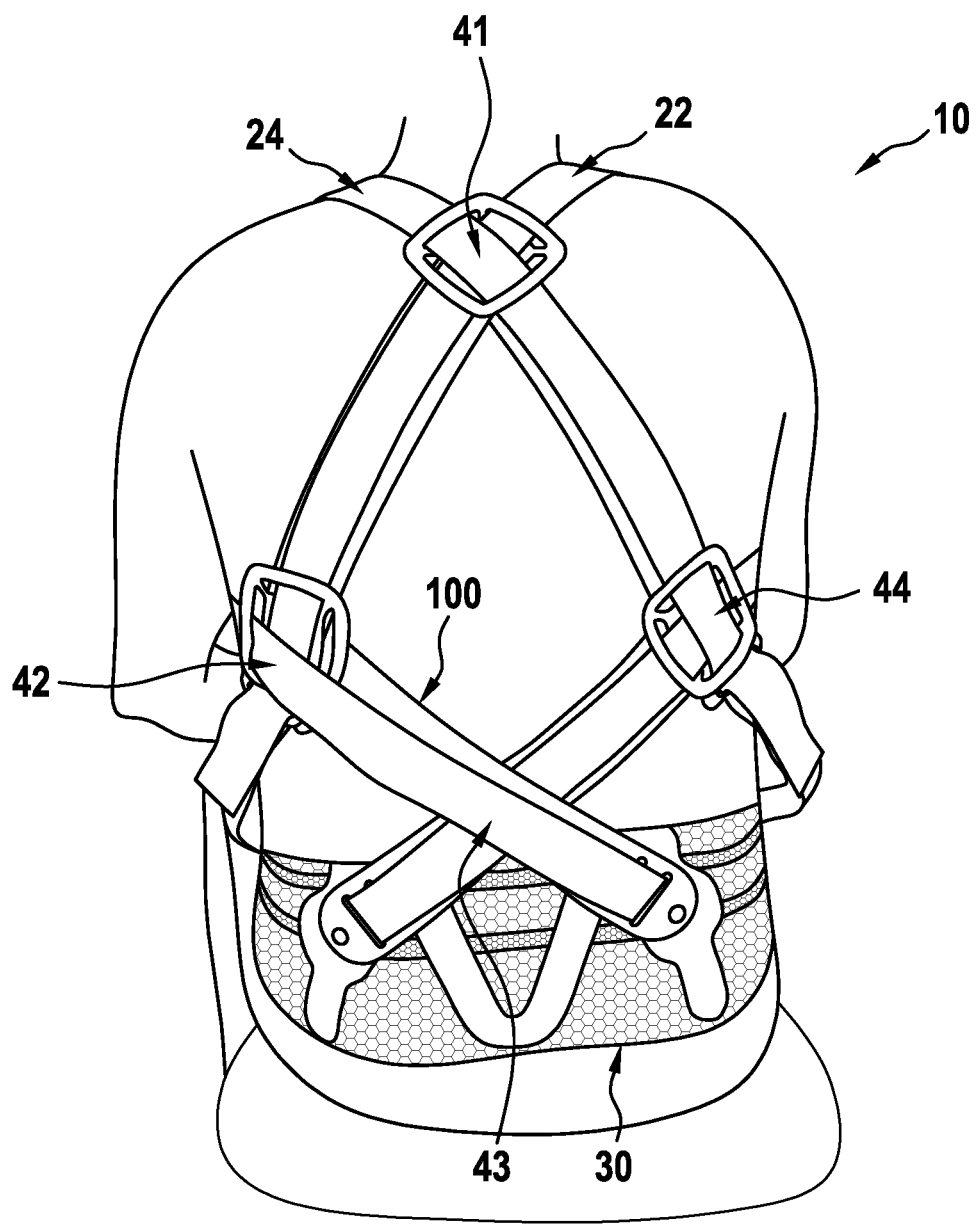
FIG. 3 shows the back orthosis of FIG. 1 on a seated person.

FIG. 2 shows the back orthosis (10) on a wearer standing, FIG. 3 shows the same back orthosis (10) on a wearer sitting. The rhombus shape formed by the right shoulder belt (22) and the left shoulder belt (24) through the guiding module (100) between the four crossing points (41, 42, 43, 44) can be clearly recognized. Also, an underlying semi rhombus shape which is formed by the mid-lower crossing point (43) where the two shoulder belts (22, 24) cross and the fourth connecting element (144) and the fifth connecting element (145) can be recognized.

Comparing the rhombus shape of the upper closed rhombus and the lower semi rhombus, it can be recognized that the leg length of the upper rhombus lengthens when the wearer sits down, while the leg length of the lower open semi rhombus shortens. At the same time, the pelvic belt (30) is not shifted upwards and thus remains in the same position for optimal treatment according to the indication.

Figure 4:
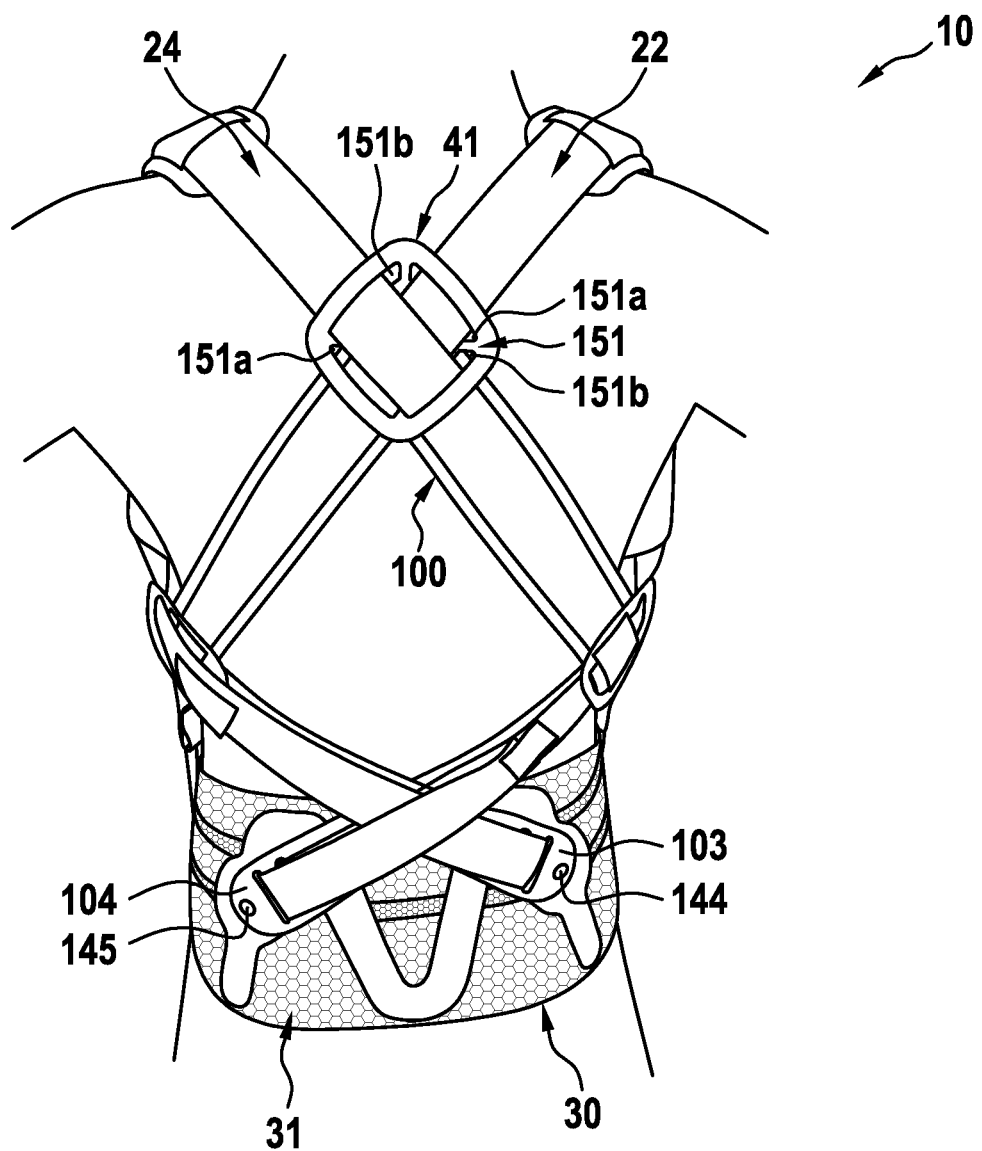
FIG. 4 shows the rear view of the back orthosis of FIG. 1.

FIG. 4 shows the rear view of the back orthosis (10) in the embodiment according to FIG. 1. The guiding module (100) is located under the two shoulder belts (22, 24) and is formed of the parts not visible here: first guiding element, second guiding element, first connecting element, second connecting element and third connecting element, as well as the at least partially visible parts: third guiding element (103), fourth guiding element (104), fourth connecting element (144) and fifth connecting element (145). The two lower guiding elements (103, 104) are rotatably fastened to the middle section (31) of the pelvic belt (30) via the two lower connecting elements (144, 145). A pass-through element (151) is attached to the first connecting element at the mid-upper crossing point (41) of the two shoulder belts (22, 24), which has a first pass-through opening (151a) for the right shoulder belt (22) and a second pass-through opening (151b) for the left shoulder belt (24), so that the two shoulder belts (22, 24) are guided at the crossing point (41) but can slide against each other, allowing a change in length and angle of these belt sections relative to each other.

Figure 5:
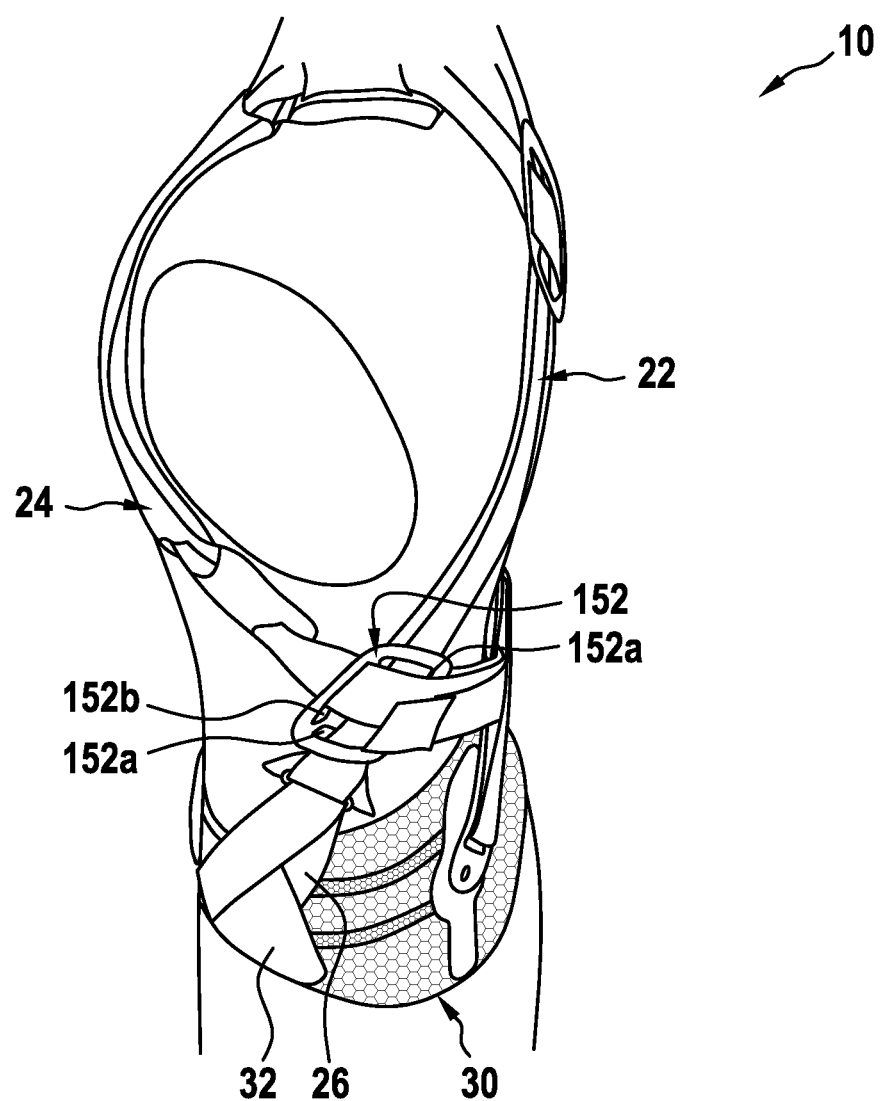
FIG. 5 shows the side view of the back orthosis of FIG. 1.

FIG. 5 shows the side view of the back orthosis (10) of FIG. 4. On the non-visible second connecting element again a pass-through element (152) with a first pass-through opening (152a) for the right shoulder belt (22) and a second pass-through opening (152b) for the left shoulder belt (24) is visible. The first end (26) of the right shoulder belt (22) is connected to the left side section (32) of the pelvic belt (30) via a Velcro connection.

Figure 6:
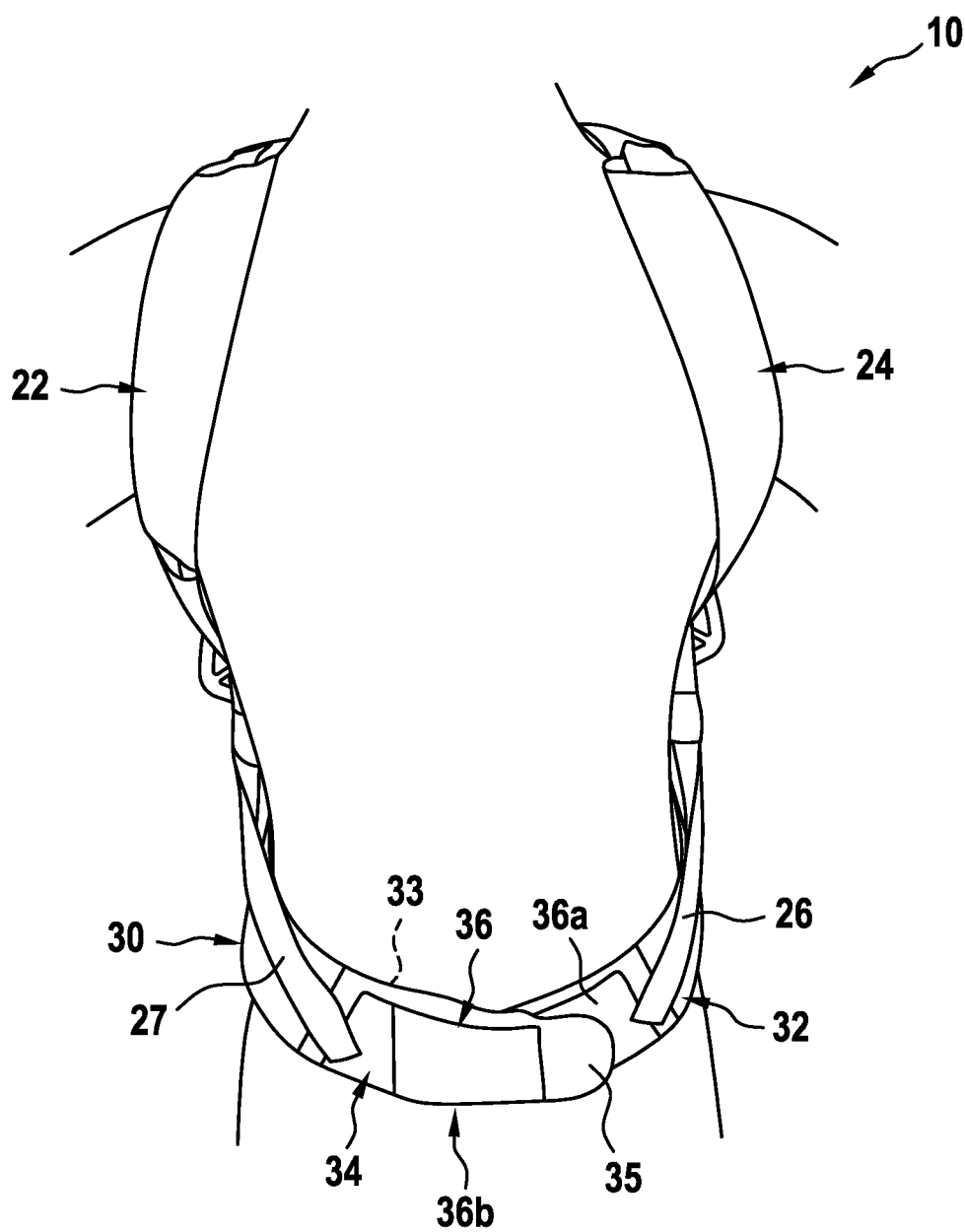
FIG. 6 shows the front view of the back orthosis of FIG. 1.

FIG. 6 shows a front view of the back orthosis (10) of FIGS. 4 and 5. The course of the right shoulder belt (22) around the right shoulder and the left shoulder belt (24) around the left shoulder of the wearer can be seen. The left side section (32) with the left pelvic belt end (33) and the right side section (34) with the right pelvic belt end (35) of the pelvic belt (30) are reversibly connected to each other by a Velcro fastener (36) of a first Velcro element (36a) on the left side section (32) and a second Velcro element (36b) located on the inside on the right side section (34) for tightening the pelvic belt (30). The first end (27) of the left shoulder belt (24) is reversibly and adjustably attached to the right side section (34) of the pelvic belt (30), the first end (26) of the right shoulder belt (22) is reversibly and adjustably attached to the left side section (32).

Figure 7:
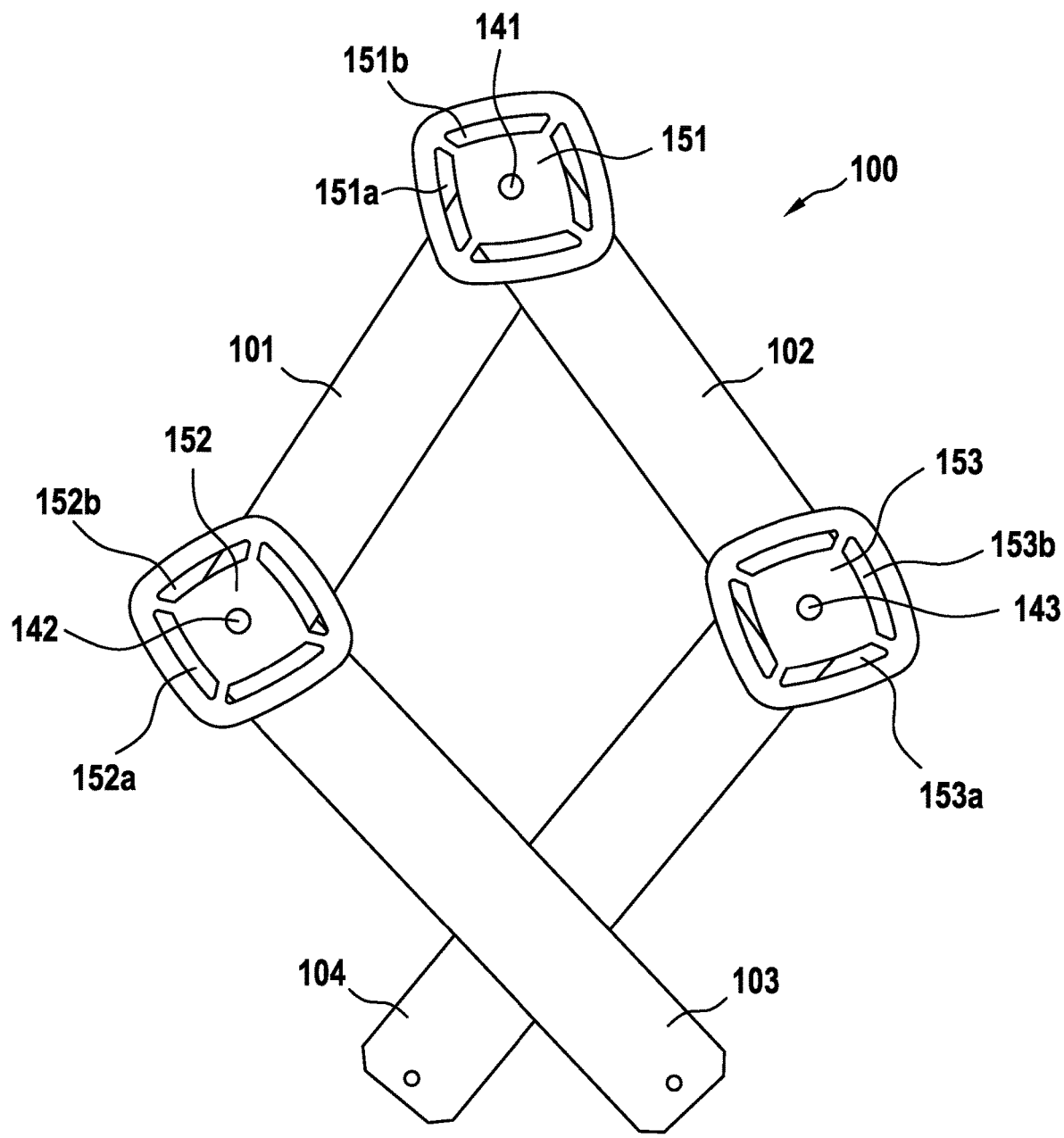
FIG. 7 shows the guiding module of the back orthosis of FIG. 1.

FIG. 7 shows the guiding module (100) of the back orthosis from FIGS. 1 to 6. The guiding module (100) comprises a first guiding element (101) and a second guiding element (102), which are rotatably connected to each other via a first connecting element (141) realized as a rivet. The first guiding element (101) is rotatably connected to the third guiding element (103) via the second connecting element (142), and the second guiding element (102) is rotatably connected to the fourth guiding element (104) via a third connecting element (143). The third guiding element (103) and the fourth guiding element (104) cross in the lower region and have holes at the lower end through which a fourth connecting element not shown and a fifth connecting element not shown can pass through as rivets and thus connect the third guiding element (103) and the fourth guiding element (104) movably to the pelvic belt. The three connecting elements (141, 142, 143) each have pass-through opening elements (151, 152, 153). These pass-through opening elements (151, 152, 153) each have a first pass-through opening (151a, 152a, 153a) and a second pass-through opening (151b, 152b, 153b) through which the shoulder belts of the back orthosis can be slidably guided so that the mid-upper crossing point, the left lateral crossing point and the mid-lower crossing point are defined and positioned by the three connecting elements (141, 142, 143).

The guiding elements (101, 102, 103, 104) are formed from a flexible plastic material which is substantially inelastic in the direction of tension, but can also be made of metal, for example a spring steel strip.

Figure 8:
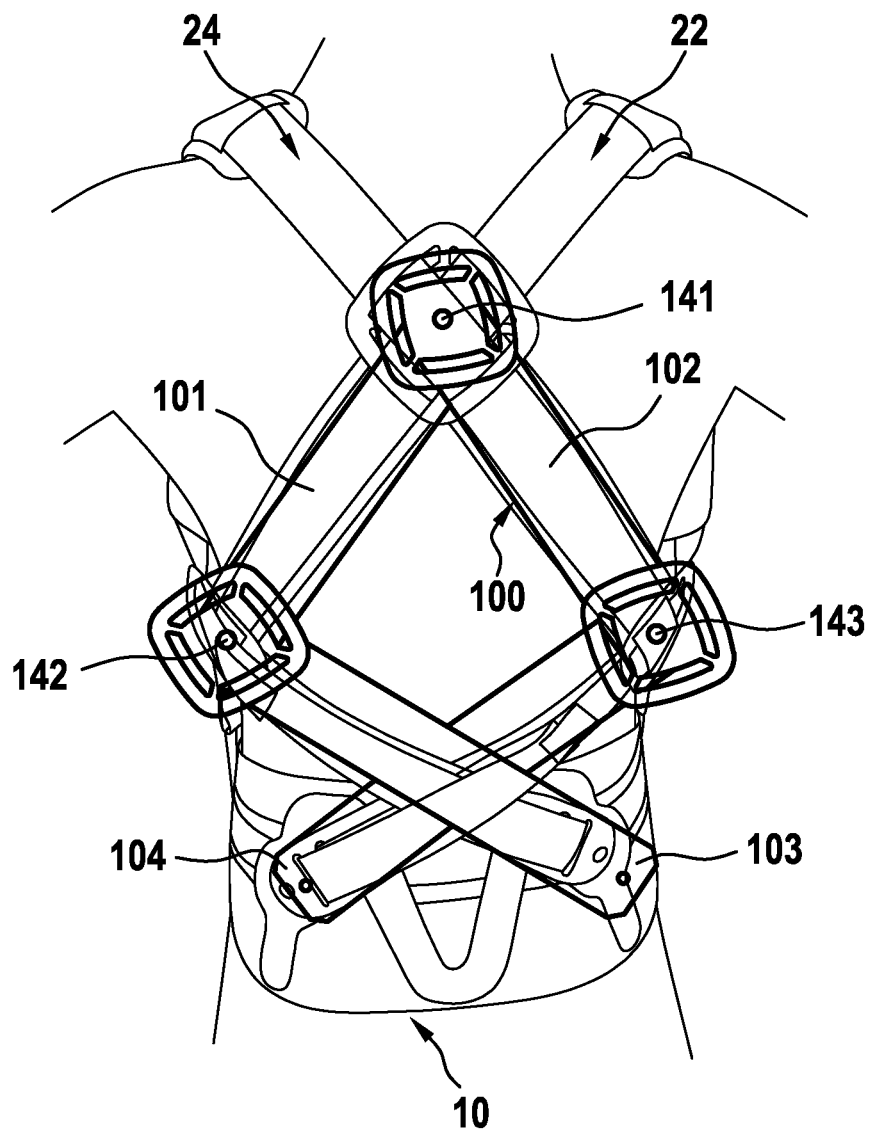
FIG. 8 shows schematically the course of the guiding module in the back orthosis of FIG. 1.

FIG. 8 schematically shows the positioning of the guiding module (100) on the ventral region of the back orthosis (10). Thereby it is to be recognised that the right shoulder belt (22) follows the course of the first guiding element (101) and the fourth guiding element (104), and the left shoulder belt (24) follows the course of the second guiding element (102) and the third guiding element (103). Furthermore, it can be recognized that the first connecting element (141) lies in the region of the mid-upper crossing point, the second connecting element (142) lies in the region of the left lateral crossing point and the third connecting element (143) lies in the region of the right lateral crossing point.

Figure 9:
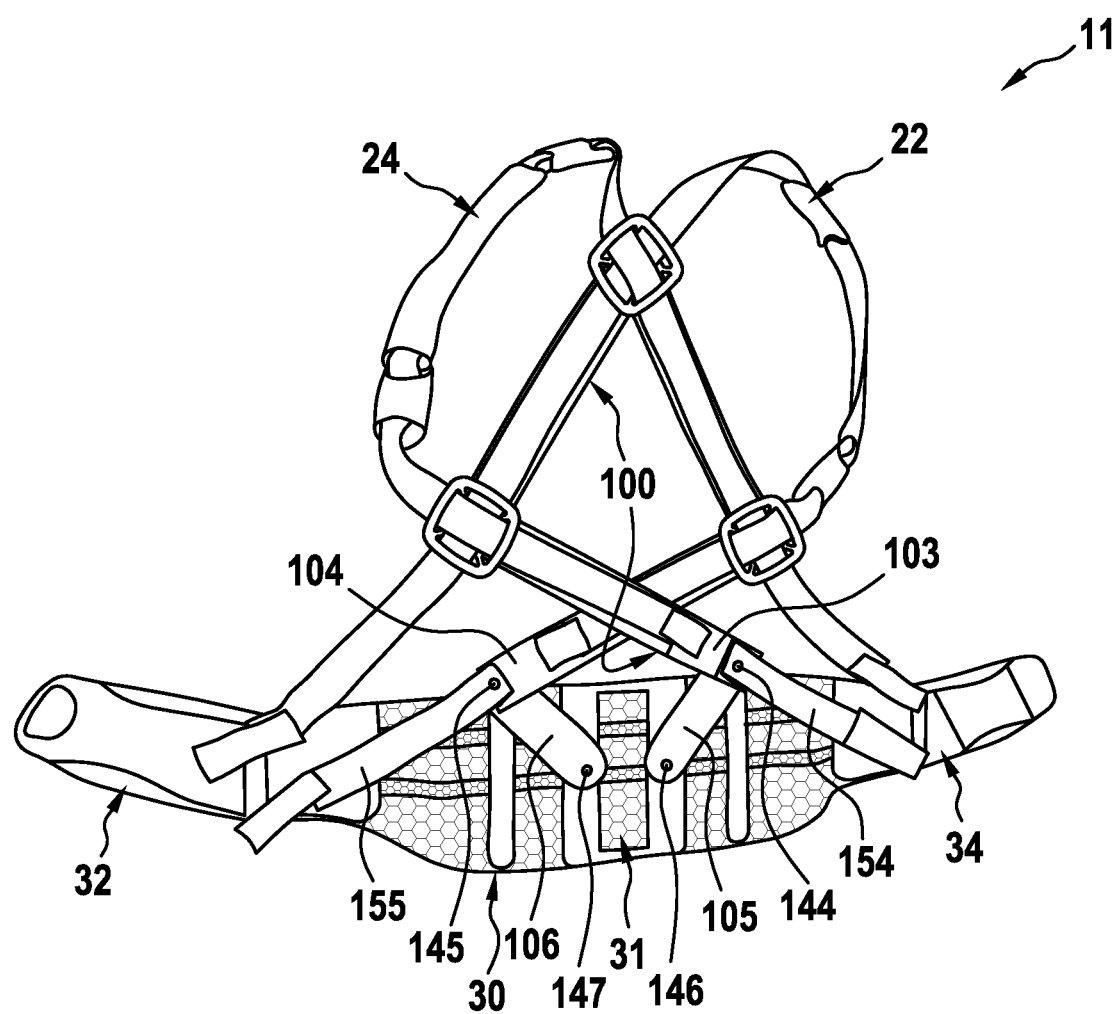
FIG. 9 shows a second embodiment of the back orthosis according to the invention.

FIG. 9 shows a second embodiment of the back orthosis (11) according to the invention. The course of the shoulder belts (22, 24) and the structure of the pelvic belt (30) are the same as in the embodiment of FIG. 1. In the present embodiment (11), however, the third guiding element (103) and the fourth guiding element (104) are not connected directly to the bandage (30) via the fourth connecting element (144) and the fifth connecting element (145), but the third guiding element (103) is hingedly connected to a fifth guiding element (105) and the fourth guiding element (104) is hingedly connected to a sixth guiding element (106). Only the fifth guiding element (105) and the sixth guiding element (106) are hingedly connected to the middle section (31) of the pelvic belt (30) via the additional sixth connecting element (146) and seventh connecting element (147). Furthermore, in this embodiment, force introducing belts are provided, wherein a first force introducing belt (154) reversibly connects the fourth connecting element (144) to the right side section (34) of the bandage (30) via a Velcro fastener and a second force introducing belt (155) reversibly connects the fifth connecting element (145) to the left side section (32) of the pelvic belt (30) via a Velcro fastener.

In this embodiment, therefore, with the guiding module (100) the additional connecting elements (105, 106) not one and a semi rhombuses, but almost two rhombuses are formed.

According to the invention, it is not excluded to supplement the guiding module (100) with further guiding elements and connecting elements and thus further rhombuses, for example with a further rhombus, further two rhombuses, further three rhombuses, further four rhombuses, further five rhombuses or more.

Figure 10:
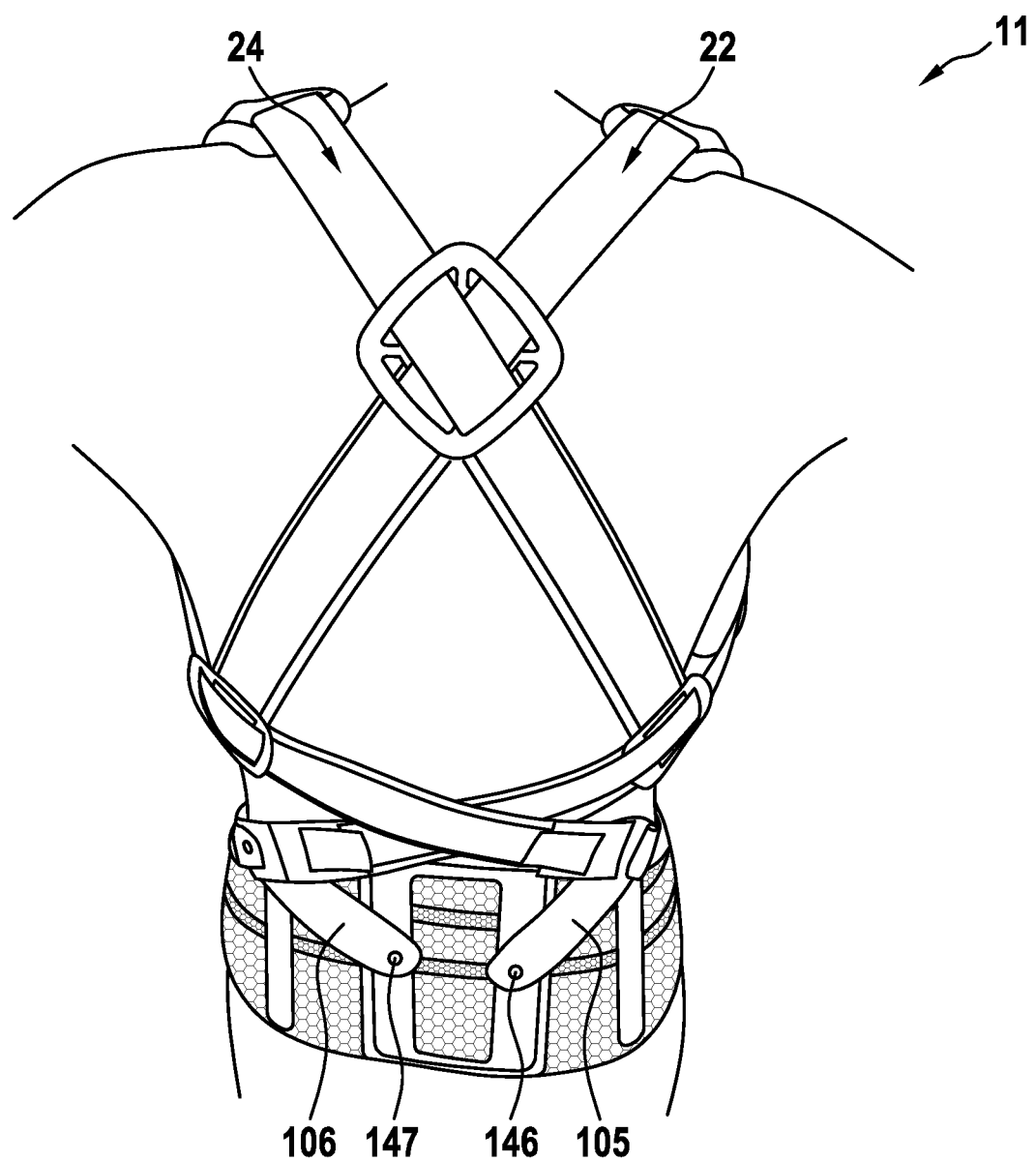
FIG. 10 shows the rear view of the back orthosis of FIG. 9.

FIG. 10 shows a rear view of the back orthosis (11) from FIG. 9. The additional guiding elements (105, 106) and the additional connecting elements (146, 147) are clearly visible in comparison to FIG. 4. The course of the two shoulder belts (22, 24) is the same as in FIG. 4, since the shoulder belts (22, 24) already end at the third and fourth guiding elements, respectively, and are reversibly and tensionably coupled to them.

Figure 11:
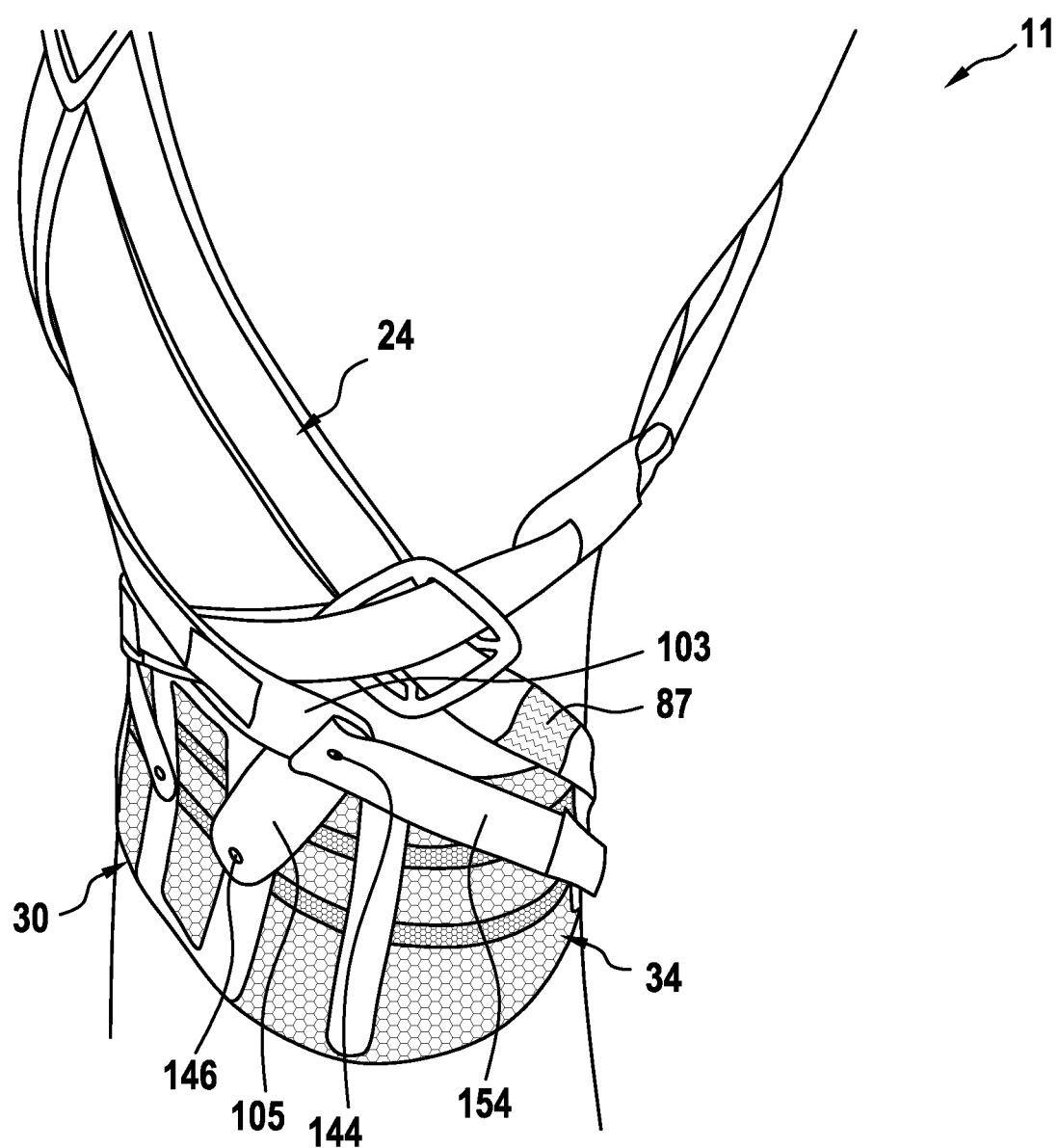
FIG. 11 shows the side view of the back orthosis of FIG. 9.

FIG. 11 shows the back orthosis (11) of FIG. 9 in right side view. The constructional design can be seen in which the third guiding element (103) is movably connected to the fifth guiding element (105) via the fourth connecting element (144), wherein the fifth guiding element (105) is movably connected to the pelvic belt (30) via a sixth connecting element (146). The fourth connecting element (144) also simultaneously couples the fifth guiding element (105) and the third guiding element (103) to the right force introducing belt (154), which is reversibly and tensionably connected to the right side section (34) of the pelvic belt (30) via a Velcro fastener.

The left shoulder belt (24) here also has a more elastic belt section (87).

Figure 12:
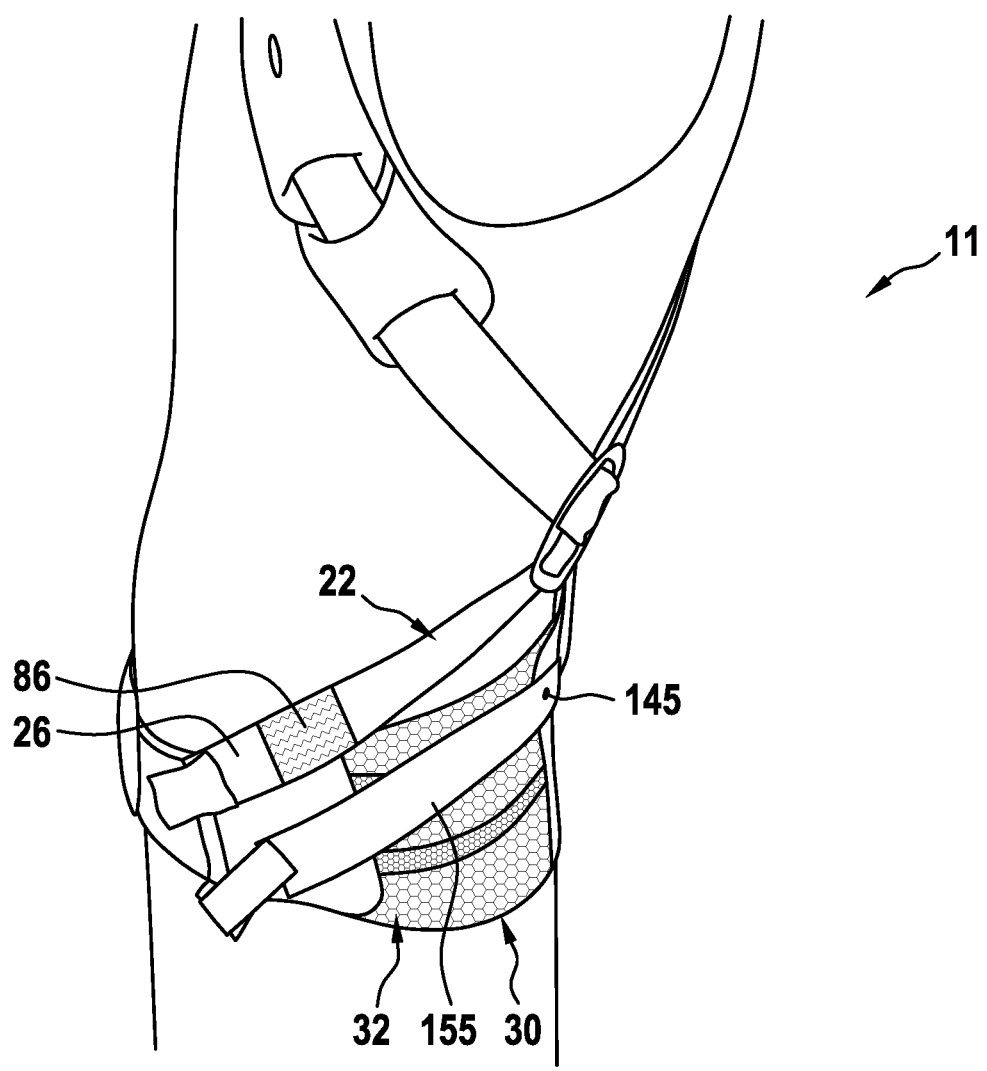
FIG. 12 shows a diagonal front view of a part of the back orthosis of FIG. 9.

FIG. 12 shows the back orthosis (11) from FIG. 9 in the left side view from diagonally in front. It can be seen how both the first end (26) of the right shoulder belt (22) and the second force introducing belt (155), which is movably fastened to the fifth connecting element (145), are each reversibly, positionably and thus tensionably fastened to the left side section (32) of the pelvic belt (30) via a Velcro connection.

The right shoulder belt (22) here additionally has a more elastic belt section (86).

Figure 13:
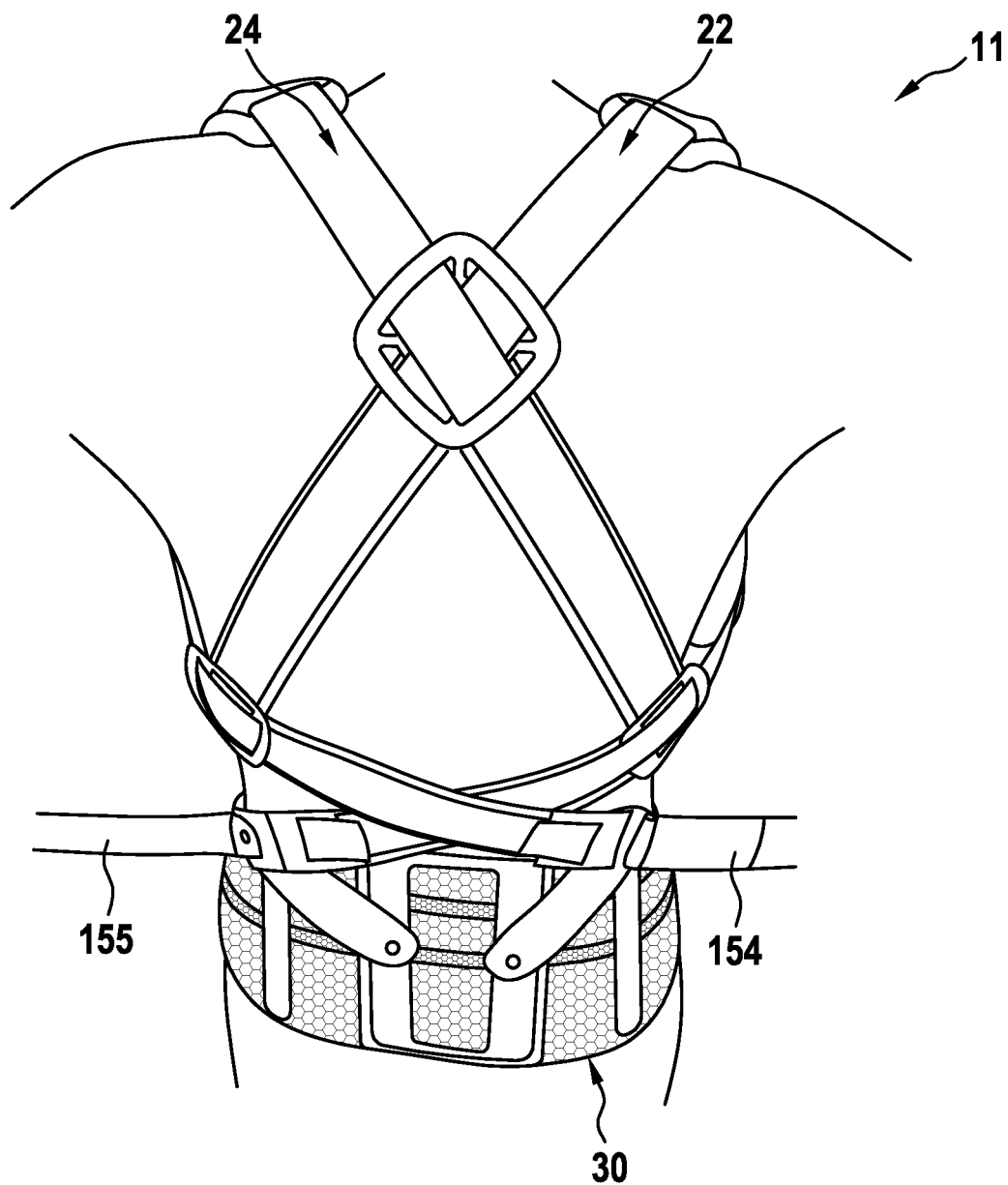
FIG. 13 shows the rear view of the back orthosis of FIG. 9 when the shoulder belts are tensioned.

FIG. 13 shows back orthosis (11) from behind, as in FIG. 10, wherein the two force introducing belts (154, 155) are detached from the pelvic belt (30). The force introducing belts (154, 155) can thus be tensioned and then fastened to the pelvic belt (30) in a tensioned state by means of Velcro fasteners, which allows the wearer to easily tension the belt system of the two shoulder belts (22, 24).

Figure 14:
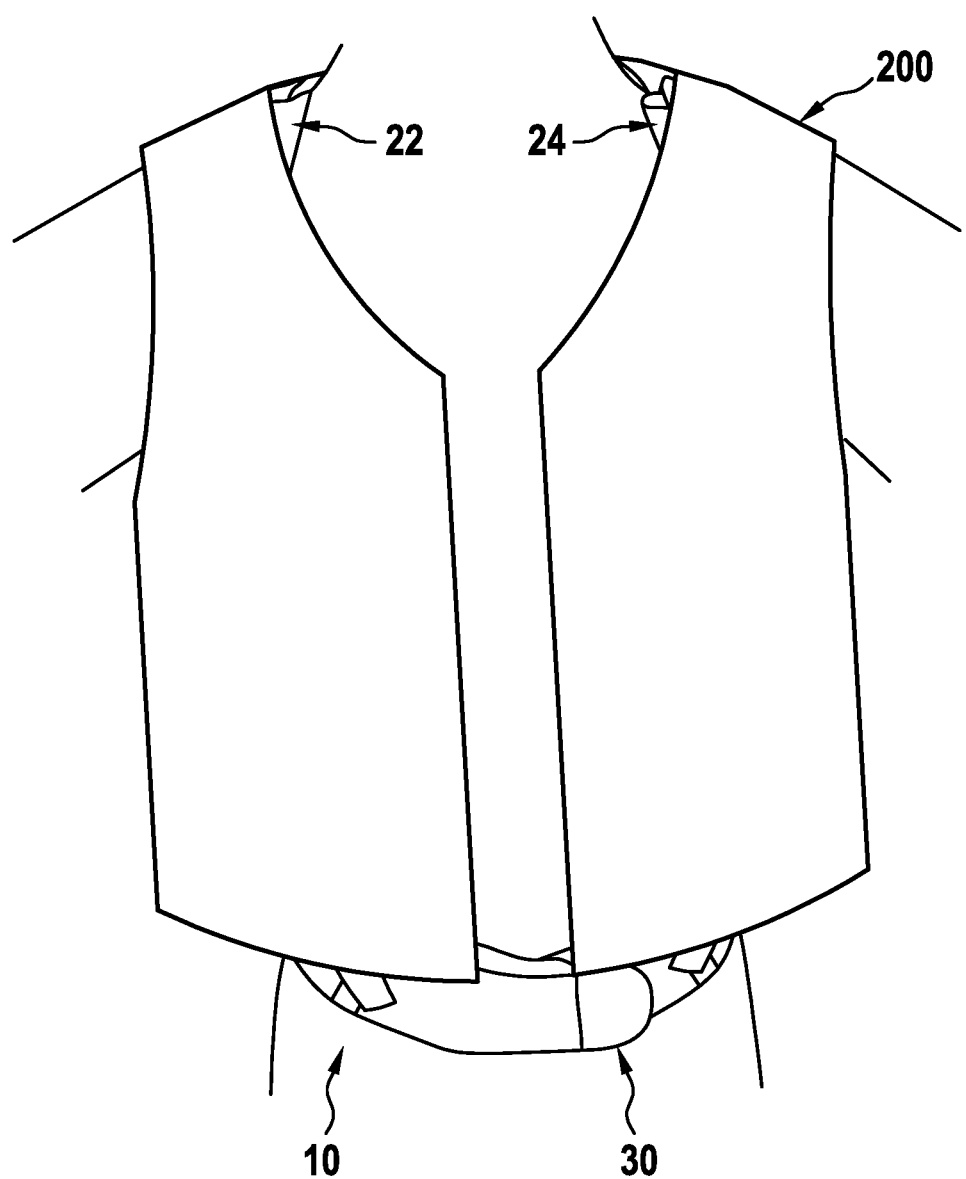
FIG. 14 shows a jacket/waistcoat with a back orthosis according to the invention.

FIG. 14 shows a jacket or waistcoat (200) rigged on with a back orthosis (10) according to the invention. The right and left shoulder belts (22, 24) and the pelvic belt (30) are at least sectionally fixedly connected to the waistcoat (200). The back orthosis (10) can thus be applied directly and immediately together with the waistcoat (200). Such a waistcoat is suitable, for example, as protective work clothing.

Figure 15:
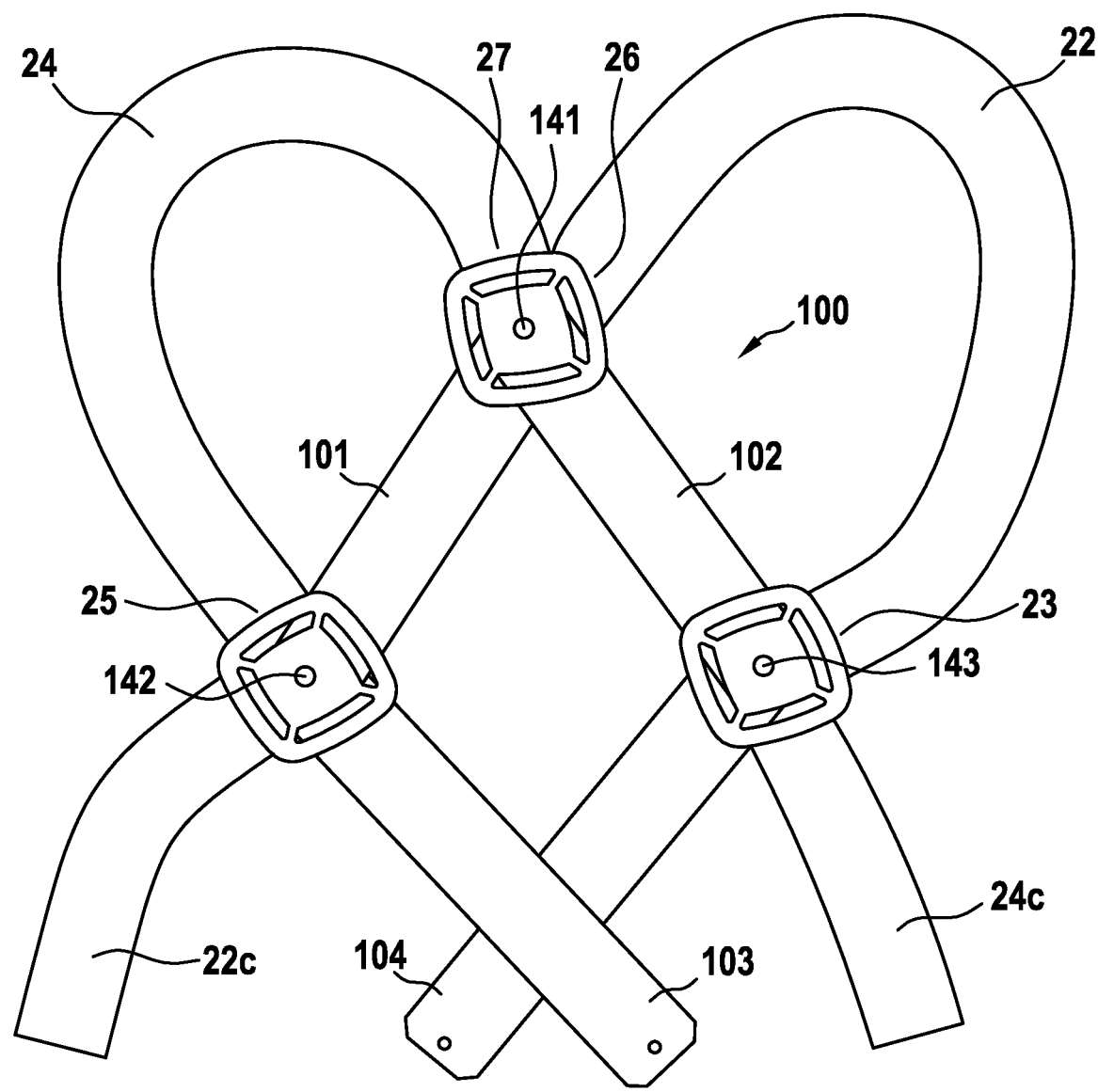
FIG. 15 shows the basic principle of an alternative embodiment of the back orthosis according to the invention.

FIG. 15 shows the basic principle of an alternative embodiment of the back orthosis according to the invention. Here the shoulder belts (22, 24) do not run on the guiding module (100), but the shoulder belts (22, 24) end at the top of the guiding module (100) and are fastened thereto. In this embodiment, the guiding module (100) forms an intermediate piece on the back between the shoulder belts (22,24) and the pelvic belt. Thus, the guiding module (100) or the guiding elements (101, 102, 103, 104) are part of the belt run.

In this embodiment, the second end (25) of the left shoulder belt (24) can be connected to the third guiding element (103) in the region of the second connecting element (142) and the second end (23) of the right shoulder belt (22) can be connected to the fourth guiding element (104) in the region of the third connecting element (143). In this embodiment, the first end (27) of the left shoulder belt (24) can also be connected to the second guiding element (102) in the region of the first connecting element (141) and the first end (26) of the right shoulder belt (22) can be connected to the first guiding element (101) in the region of the first connecting element (141). The respective connections may of course be reversible designed.

In addition, it may be provided that a first additional belt (24c) is connected in the region of the third connecting element (143) to the second guiding element (102) and guides to and is connected to the right side section of the pelvic belt (not shown) and a second additional belt (22c) is connected in the region of the second connecting element (142) to the first guiding element (101) and guides to and is connected to the left side section of the pelvic belt (not shown). The respective connections may of course be reversible designed.

The invention claimed is:

1. A back orthosis (10,11) containing:
a pelvic belt (30) that extends laterally for applying to the pelvis of a wearer, having a lumbar/sacral positionable middle section (31) and, a left side section (32) with a left pelvic belt end (33) and a right side section (34) with a right pelvic belt end (35), wherein the pelvic belt ends (33, 35) are connectable to one another under tension,
a right shoulder belt (22) configured to fit over the right shoulder of the wearer, connected by a first end (26) of the right shoulder belt (22) to the left side section (32) of the pelvic belt (30), and
a left shoulder belt (24) for applying over the left shoulder of the wearer, connected by its first end (27) to the right side section (34) of the pelvic belt (30), wherein, when the right shoulder belt (22) and the left shoulder belt (24) are in an applied state, the right shoulder belt (22) and the left shoulder belt (24) cross at a dorsal mid-upper crossing point (41), a dorsal mid-lower crossing point (43) and at two lateral crossing points (42, 44), wherein
the back orthosis has a guiding module (100) associated with the right shoulder belt (22) and the left shoulder belt (24), wherein the guiding module (100) comprises
a first guiding element (101),
a second guiding element (102)
a third guiding element (103)
a fourth guiding element (104)
a first connecting element (141)
a second connecting element (142)
a third connecting element (143)
a fourth connecting element (144)
a fifth connecting element (145),
wherein the first connecting element (141) is positioned at the dorsal mid-upper crossing point (41) and connects the first guiding element (101) and the second guiding element (102) as a joint, wherein the second connecting element (142) is positioned at the first lateral crossing point (42) and connects the first guiding element (101) and the third guiding element (103) as a joint, wherein the third connecting element (143) is positioned at the second lateral crossing point (44) and connects the second guiding element (102) and the fourth guiding element (104) as a joint, wherein the third guiding element (103) and the fourth guiding element (104) cross over in the region of the dorsal mid-lower crossing point (43), wherein the right shoulder belt (22) is connected to the guiding module (100) via its second end (23) and the left shoulder belt (24) is connected to the guiding module (100) via its second end (25), in particular the right shoulder belt (22) is reversibly connected to the fourth guiding element (104) via its second end (23) and wherein the left shoulder belt (24) is reversibly connected to the third guiding element (103) via its second end (25).

2. The back orthosis (11) according to claim 1, wherein the fourth connecting element (144) connects the third guiding element (103) and a fifth guiding element (105) as a joint, wherein the fifth connecting element (145) connects the fourth guiding element (104) and a sixth guiding element (106) as a joint, wherein the fifth guiding element (105) is connected to the middle section (31) of the pelvic belt (30) via a sixth connecting element (146) as a joint and the sixth guiding element (106) is connected to the middle section (31) of the pelvic belt (30) via a seventh connecting element (147) as a joint.

3. The back orthosis according to claim 2, wherein a hingedly connected force introducing belt (154, 155) is fastened to the fourth connecting element (144) and to the fifth connecting element (145), respectively, wherein the hingedly connected force introducing belts (154, 155) are reversibly connected to the pelvic belt.

4. The back orthosis according to claim 1, wherein the first connecting element (141), the second connecting element (142) and/or the third connecting element (143) have pass-through openings (151, 152, 153) through which the right shoulder belt (22) and the left shoulder belt (24) are slidably guided.

5. The back orthosis according to claim 4, wherein the first connecting element (141), the second connecting element (142) and the third connecting element (143) each have a first pass-through opening (151a, 152a, 153a) through which the right shoulder belt (22) is slidably guided and each have a second pass-through opening (151b, 152b, 153b) through which the left shoulder belt (24) is slidably guided.

6. The back orthosis (10) according to claim 1, wherein the third guiding element (103) is connected directly to the middle section (31) of the pelvic belt (30) via the fourth connecting element (144) as a joint and the fourth guiding element (104) is connected directly to the middle section (31) of the pelvic belt (30) via the fifth connecting element (145) as a joint.

7. The back orthosis according to one claim 1, wherein that the guiding elements (101, 102, 103, 104, 105, 106) are formed from a flexible material which is inelastic in a direction of tension.

8. The back orthosis according to claim 1, wherein an elastic belt section (86, 87) is formed between the first end (26, 27) of the right or left shoulder belts (22, 24) and the lateral crossing point (42, 44), respectively, the elasticity of which is equal to or higher than that of the right or left shoulder belts (22, 24) themselves.

9. The back orthosis according to claim 1, wherein the first ends (26, 27) of the shoulder belts (22, 24) are reversibly connected to the pelvic belt (30), in particular via a hook and loop fastener.

10. The back orthosis according to claim 1, wherein the second ends (23, 25) of the shoulder belts (22, 24) are variably adjustable on the fourth and the third guiding element (104, 103), wherein each of the fourth guiding element (104) and the third guiding element (103) has at least one deflecting element (164, 163) through which the right and left shoulder belts (22, 24) are guided through respectively and the second ends (23, 25) are reversibly and variably fastened to the shoulder belt (22, 24).

11. The back orthosis according to claim 1, wherein the right and left shoulder belts (22, 24) do not run on the guiding module (100), but wherein the right and left shoulder belts (22, 24) end at the top of the guiding module (100) and are fastened thereto.

12. The back orthosis according to claim 1, wherein the shoulder belts or the hingedly connected force introducing belts are formed by a cable pull system.

13. A clothing item containing a stretchable waistcoat or jacket (200) and a back support belt system characterised in claim 1, wherein right and left shoulder belts (22, 24) and pelvic belt (30) are at least sectionally rigged on a waistcoat or jacket (200) and fixedly connected thereto.

14. A method for protecting a subject against disadvantageous stresses on the back, comprising applying the back orthosis according to claim 1 to the back.

\* \* \* \* \*